(12) United States Patent
Kohshoh et al.

(10) Patent No.: US 11,742,724 B2
(45) Date of Patent: Aug. 29, 2023

(54) ELECTRIC ACTUATOR

(71) Applicant: ASAHI YUKIZAI CORPORATION, Nobeoka (JP)

(72) Inventors: Kenji Kohshoh, Nobeoka (JP); Shinobu Kamimura, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 520 days.

(21) Appl. No.: 17/057,854

(22) PCT Filed: Apr. 24, 2019

(86) PCT No.: PCT/JP2019/017494
§ 371 (c)(1),
(2) Date: Nov. 23, 2020

(87) PCT Pub. No.: WO2019/225277
PCT Pub. Date: Nov. 28, 2019

(65) Prior Publication Data
US 2021/0301939 A1 Sep. 30, 2021

(30) Foreign Application Priority Data
May 25, 2018 (JP) .................................. 2018-100695

(51) Int. Cl.
*H02K 11/21* (2016.01)
*H02K 5/04* (2006.01)
(Continued)

(52) U.S. Cl.
CPC ............... *H02K 11/21* (2016.01); *H02K 5/04* (2013.01); *H02K 7/14* (2013.01); *H02K 11/23* (2016.01); *F16K 31/05* (2013.01); *G01V 11/00* (2013.01)

(58) Field of Classification Search
CPC .......... H02K 11/21; H02K 11/23; H02K 5/04; H02K 7/14; F16K 31/05; G01V 11/00
(Continued)

(56) References Cited

U.S. PATENT DOCUMENTS

2003/0030337 A1\* 2/2003 Aoki ....................... F16K 31/05
310/68 R
2005/0184265 A1 8/2005 Aoki et al.
(Continued)

FOREIGN PATENT DOCUMENTS

CN 1662763 A 8/2005
CN 102403831 A 4/2012
(Continued)

OTHER PUBLICATIONS

China National Intellectual Property Administration, "Search Report for Chinese Patent Application 2019800259642," dated Mar. 16, 2022.
(Continued)

*Primary Examiner* — Alexander A Singh
(74) *Attorney, Agent, or Firm* — Manabu Kanesaka (57) ABSTRACT

An electric actuator includes a housing, an electric driving unit, an selector member being rotatable about a rotation axis and moving in a direction of the rotation axis, a position holding member and detection object provided in the selector member, a detector, an engagement groove provided on a cooperation surface inside the housing, and a biasing member biasing the selector member in the direction of the rotation axis to make the position holding member approach the cooperation surface. The engagement groove is formed so that the detection object is positioned in one of a detectable area and an undetectable area when the position holding member is engaged with the engagement groove, and the detector is configured to switch between supply and
(Continued)

cutoff of power to the electric driving unit in accordance with whether or not the detection object is detected.

11 Claims, 9 Drawing Sheets

(51) Int. Cl.
*H02K 7/14* (2006.01)
*H02K 11/23* (2016.01)
*F16K 31/05* (2006.01)
*G01V 11/00* (2006.01)

(58) Field of Classification Search
USPC ........................................................ 310/75 R
See application file for complete search history.

(56) References Cited

U.S. PATENT DOCUMENTS

| | | | |
|---|---|---|---|
| 2014/0041468 A1* | 2/2014 | Yukitake | H02K 7/116 74/89 |
| 2015/0133255 A1* | 5/2015 | Atsumi | B25B 21/008 475/153 |

FOREIGN PATENT DOCUMENTS

| | | |
|---|---|---|
| CN | 103574017 A | 2/2014 |
| DE | 102012213177 A1 | 1/2014 |
| GB | 2347197 A | 8/2000 |
| JP | S62-012945 Y2 | 4/1987 |
| JP | H08-021557 A | 1/1996 |
| JP | 2000-026076 A | 1/2000 |
| JP | 2006-292124 A | 10/2006 |

OTHER PUBLICATIONS

PCT/ISA/210, "International Search Report for International Application No. PCT/JP2019/017494," dated Jul. 30, 2019.
Taiwan Intellectual Property Office, "Office Action for Taiwanese Patent Application 108114879," dated Jul. 25, 2022.
Taiwan Intellectual Property Office, "Search Report for Taiwanese Patent Application 108114879," dated Jul. 25, 2022.
European Patent Office, "Extended European Search Report and Search Opinion for European Application No. 19807427 0," dated Jan. 28, 2022.
Japan Patent Office, "Office Action for Japanese Patent Application 2020-521128," dated Sep. 20, 2022.

* cited by examiner

ELECTRIC ACTUATOR

RELATED APPLICATIONS

The present application is National Phase of International Application No. PCT/JP2019/017494 filed Apr. 24, 2019, and claims priority from Japanese Application No. 2018-100695, filed May 25, 2018, the disclosure of which is hereby incorporated by reference herein in its entirety.

TECHNICAL FIELD

The present invention relates to an electric actuator that drives an output shaft connected to a valve or the like by means of an electric driving unit.

BACKGROUND ART

In a valve such as a ball valve and a butterfly valve, an electric actuator may be used as a drive device for opening and closing operations. The electric actuator is configured to transmit a driving force of an electric driving unit such as an electric motor to an output shaft (for example, stem) connected to a valve body of a valve, etc., to rotate the output shaft. There is also an electric actuator that includes a manual operation mechanism allowing an output shaft to be manually operated, in order to make a manual operation enabled in the event of maintenance, power outage, or the like.

When the electric actuator is required to be manually operated or to be brought to an emergency stop, it is necessary to cut off the supply of power to the electric actuator by using a switch such as a breaker provided on a power supply line wired to the electric actuator. However, there are some cases where the supply of power cannot be cut off immediately, for example, for a reason why a switch is far away. Therefore, it is desirable that the supply of power to the electric driving unit can be cut off inside the electric actuator.

To address the above problem, PTL 1 discloses, for example, an actuator in which: an output shaft is driven via a gear unit by a driving shaft of an electric motor provided inside a casing; a clutch rod disengaging a clutch gear, which is one of an intermeshing gear group of the gear unit, with a pressing stroke of a clutch button, is provided so as to be movable up and down; a switch turning on and off a power supply of the actuator with a pressing-releasing stroke of the clutch button is also provided; the power supply is turned off and the clutch gear is disengaged from an output gear fixed to the output shaft by pressing the clutch button; and a manual operation is enabled in this state by a manual operation end that moves in conjunction with the output shaft protruding from the upper surface of the casing. PTL 2 suggests an electric actuator configured to include: an interlock switch being fixed to a reference plane inside the electric actuator that outputs the drive of a motor to an output shaft via a gear reduction mechanism; a manual shaft that moves in conjunction with the output shaft being erected near the interlock switch; a connecting element with a cam part being connected to the manual shaft so as to be movable up and down; and the cam part of the connecting element abutting against a switch part of the interlock switch when the lower end of the connecting element abuts against the reference plane, so that when a manual operation shaft connected to the connecting element is moved up, the cam part is disengaged from the switch part to stop the supply of power and a corner portion provided inside a cylindrical part of the connecting element is engaged with a corner portion formed on the upper end of the manual shaft to be able to rotationally drive the manual operation shaft and the manual shaft via the connecting element.

CITATION LIST

Patent Literature

PTL1: Japanese Unexamined Patent Publication No. H8-21557
PTL2: Japanese Patent Publication No. 4744915

SUMMARY OF THE INVENTION

Technical Problem

In the electric actuator disclosed in PTL1 and PTL2, switching between the supply of power and the cutoff of power is performed only by moving the clutch button or the manual operation shaft up and down. Therefore, switching may be performed by erroneous operation. In particular, if the supply of power is resumed when a manual operation is being performed in a state where the supply of power is cut off, there may be a risk that a manual operation part is rotated in conjunction with the rotation of the output shaft to thereby cause danger to an operator.

Accordingly, it is an object of the present invention to solve the problem existing in the prior art and to provide an electric actuator that can easily and safely perform a switching operation between the supply of power and the cutoff of power.

Solution to Problem

In view of the above-described object, the present invention provides an electric actuator including a housing and an electric driving unit driving an output shaft supported by the housing, the electric actuator including: a selector member having a working end portion protruding inside the housing and an operating end portion protruding outside the housing, the selector member being rotatable about a rotation axis and movable in a direction of the rotation axis by operation of the operating end portion; a position holding member provided on the working end portion side of the selector member so as to protrude in a direction intersecting the rotation axis; a detection object provided at the working end portion of the selector member so as to extend in the direction intersecting the rotation axis; a detector provided inside the housing to detect the detection object; a first engagement groove provided on a cooperation surface inside the housing so as to be able to engage with the position holding member; and a biasing member biasing the selector member in the direction of the rotation axis to make the position holding member approach the cooperation surface, in which the first engagement groove is formed so that the detection object is positioned in one of a detectable area where the detection object can be detected by the detector and an undetectable area in which the detection object cannot be detected by the detector when the position holding member is engaged with the first engagement groove, and the detector is configured to switch between supply and cutoff of power to the electric driving unit in accordance with whether the detection object is positioned in the detectable area or in the undetectable area.

In the above-described electric actuator, the detection object provided on the working end portion of the selector member can be moved between the detectable and undetectable areas of the detector by rotating the selector member about the rotation axis by operation of the operating end portion, and switching between the supply and cutoff of power to the electric driving unit is performed depending on whether the detection object provided on the working end portion of the selector member is positioned in the detectable area of the detector or in the undetectable area of the detector. Moreover, because the rotation of the selector member about the rotation axis is disturbed in the state where the selector member is biased toward the cooperation surface by the biasing member and the position holding member provided at the working end portion side of the selector member is engaged with the first engagement groove provided on the cooperation surface, it is necessary to move the selector member in the direction of the rotation axis against the biasing force of the biasing member in order to disengage the position holding member and the first engagement groove from each other. Therefore, in order to switch between the supply and cutoff of power, both the movement along the rotation axis and the rotation about the rotation axis are required.

In the above-described electric actuator, it is preferable that the detector is configured to cut off the supply of power to the electric driving unit when the detection object is detected and that the first engagement groove is formed so that the detection object is positioned in the detectable area when the position holding member is engaged with the first engagement groove. In this case, locking can be performed in the state where the supply of power is cut off, thereby enhancing the safety in maintenance and inspection.

Also, preferably, the electric actuator further including a second engagement groove provided on the cooperation surface and extending in a direction intersecting the first engagement groove, the second engagement groove being formed so that the detection object is positioned in the other of the detectable area and the undetectable area when the position holding member is engaged with the second engagement groove. Such a configuration makes it possible to perform locking in both the power supply state and the power supply cutoff state, thereby further enhancing the safety. In this case, the first engagement groove and the second engagement groove can be formed so as to be orthogonal to each other.

According to one embodiment, the cooperation surface may be an inner surface of a peripheral wall of the housing through which the selector member extends.

According to one embodiment, the electric driving unit may be an electric motor. In this case, it is preferable that the electric actuator further includes a driving circuit for controlling drive of the electric motor, the electric motor is supplied with power via the driving circuit, and the detector is configured to electrically cut off the driving circuit and the electric motor when the detection object is detected. Moreover, in this case, it is preferable that the output shaft is configured to be driven by the electric motor via a transmission mechanism and that the electric actuator further includes a manual operation shaft which can transmit rotation to the output shaft via the transmission mechanism. Such a configuration makes it possible to prevent a back electromotive force generated in the electric motor during manual operation from adversely affecting the driving circuit.

In one embodiment, the detector may be a limit switch configured to detect the detection object by contact with the detection object, the position holding member may be formed integrally with the selector member, and the detection object may be a pin-shaped separate member connected to the selector member.

Advantageous Effect of the Invention

According to the electric actuator of the present invention, both movement along the rotation axis and rotation about a rotation axis are required in order to switch between the supply of power and the cutoff of power, and a malfunction can be prevented while a switching operation is easy. Moreover, because switching cannot be performed unless an operator knows an operation for switching, the safety can be enhanced even though a mechanism configuration is simple.

DESCRIPTION OF EMBODIMENTS

An embodiment of an electric actuator according to the present invention will be described below with reference to the drawings.

First, an overall configuration of the electric actuator according to the present invention will be described with reference to FIGS. 1 to 4. In the embodiment shown in FIGS. 1 to 4, an electric actuator 11 having a manual operation mechanism is exemplified as the electric actuator.

The electric actuator 11 includes a housing 13 having a generally box shape, an electric motor 15 serving as an electric driving unit arranged inside the housing 13, an output shaft 19 rotated by the rotation of a rotating shaft 15a of the electric motor 15 transmitted via a gear transmission mechanism 17, a control shaft 21 connected to an upper portion of the output shaft 19, a manual operation mechanism 23, and a power supply switching mechanism 25 for selectively switching between the supply and cutoff of power to the electric motor 15. By this configuration, the output shaft 19 can be manually rotated by using the manual operation mechanism 23 in a state where the supply of power to the electric motor 15 is cut off by the power supply switching mechanism 25.

Figure 1:
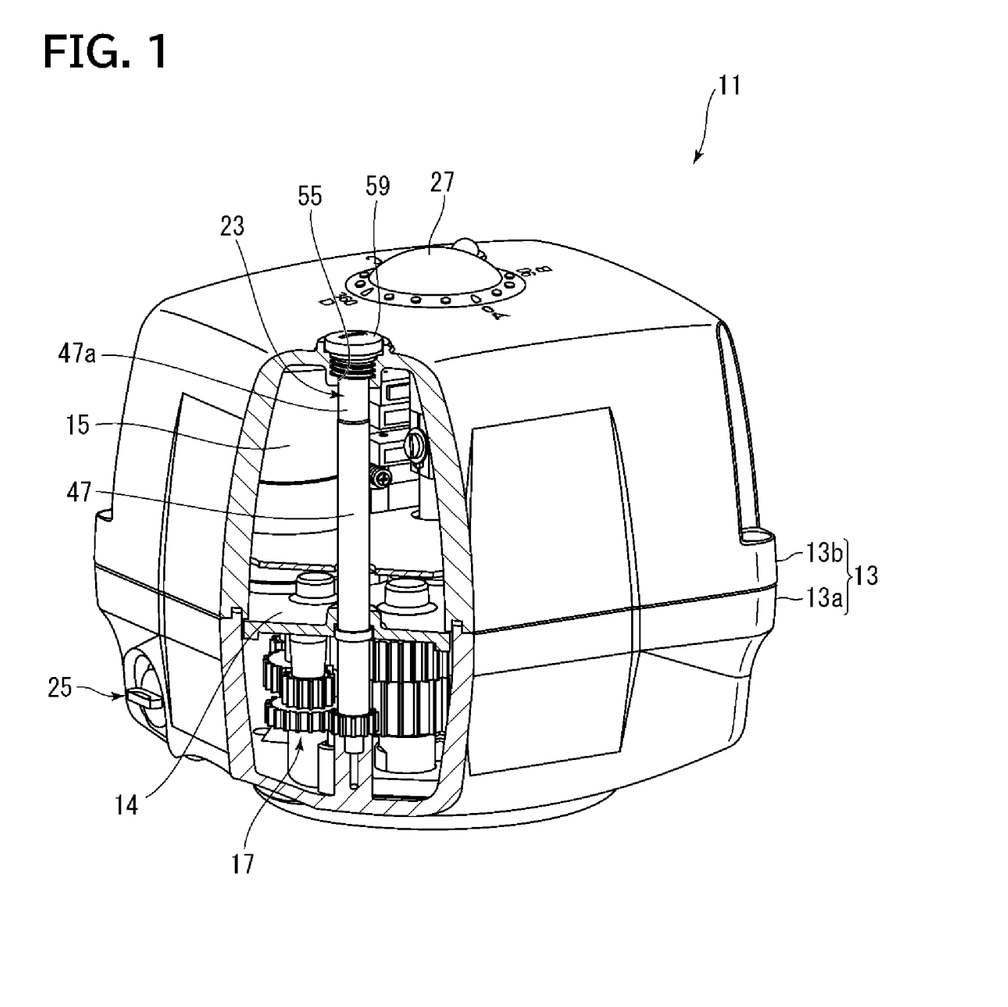
FIG. 1 is a partially broken perspective view showing an internal configuration of an electric actuator according to the present invention.

The housing 13 is configured by a body part 13a and a cover part 13b, and is assembled by mounting the cover part 13b onto an upper portion of the body part 13a by using a screw or the like not shown. There is a plate member 14 mounted to the upper portion of the body part 13a. The body part 13a, the cover part 13b, and the plate member 14 can be formed of a plastic material, a metal material, or the other appropriate material. Any type of motor such as an AC motor, a DC motor, a stepping motor, and a servo motor can be used as the electric motor 15. Although the electric motor 15 is used as an electric driving unit in this embodiment, another type of electric driving device can also be used.

The output shaft 19 and the control shaft 21 can be formed of appropriate materials, but is preferably formed of metal material. The output shaft 19 is rotatably supported inside the housing 13, and its lower end is adapted to be able to be connected to a stem etc. of a valve not shown. The control shaft 21 has one end connected to an upper end of the output shaft 19, and is rotatably supported by the plate member 14. In this embodiment, the control shaft 21 is provided, on the upper portion thereof, with a valve opening indicator 27 that can be visually recognized from the outside of the housing 13 in order to be adapted to be used for opening and closing a valve body of the valve, so that a rotational position of the output shaft 19 connected to the control shaft 21 can be recognized.

The gear transmission mechanism 17, which is configured of a plurality of gears, is housed in the body part 13a and arranged below the plate member 14. In this embodiment, as shown in detail in FIGS. 3 and 4, the gear transmission mechanism 17 is configured of a pinion gear 35 fixed to the rotating shaft 15a of the electric motor so as to rotate in conjunction with the rotating shaft 15a, a first intermediate gear 37 attached to a first intermediate shaft 29 and engaging with the pinion gear 35, a second intermediate gear 39 attached to the first intermediate shaft 29 coaxially with the first intermediate gear 37 and rotating in conjunction with the first intermediate gear 37, a third intermediate gear 41 attached to a second intermediate shaft 31 and engaging with the second intermediate gear 39, a fourth intermediate gear 43 attached to the second intermediate shaft 31 coaxially with the third intermediate gear 41 and rotating in conjunction with the third intermediate gear 41, and an input gear 45 fixed to the output shaft 19 so as to rotate in conjunction with the output shaft 19 and engaging with the fourth intermediate gear 43. This configuration makes it possible to transmit the rotation of the rotating shaft 15a of the electric motor 15 to the output shaft 19 via the pinion gear 35, the first intermediate gear 37, the second intermediate gear 39, the third intermediate gear 41, the fourth intermediate gear 43, and the input gear 45. Both ends of the first intermediate shaft 29 and the second intermediate shaft 31 are rotatably supported by the bottom of the body part 13a of the housing 13 and the plate member 14, respectively. The first intermediate gear 37 and the second intermediate gear 39 attached to the first intermediate shaft 29 may be fixed to the first intermediate shaft 29 so as to rotate in conjunction with the first intermediate shaft 29 or may be attached to the first intermediate shaft 29 so as to freely rotate about the first intermediate shaft 29. Similarly, the third intermediate gear 41 and the fourth intermediate gear 43 attached to the second intermediate shaft 31 may be fixed to the second intermediate shaft 31 so as to rotate in conjunction with the second intermediate shaft 31 or may be attached to the second intermediate shaft 31 so as to freely rotate around the second intermediate shaft 31.

Figure 3:
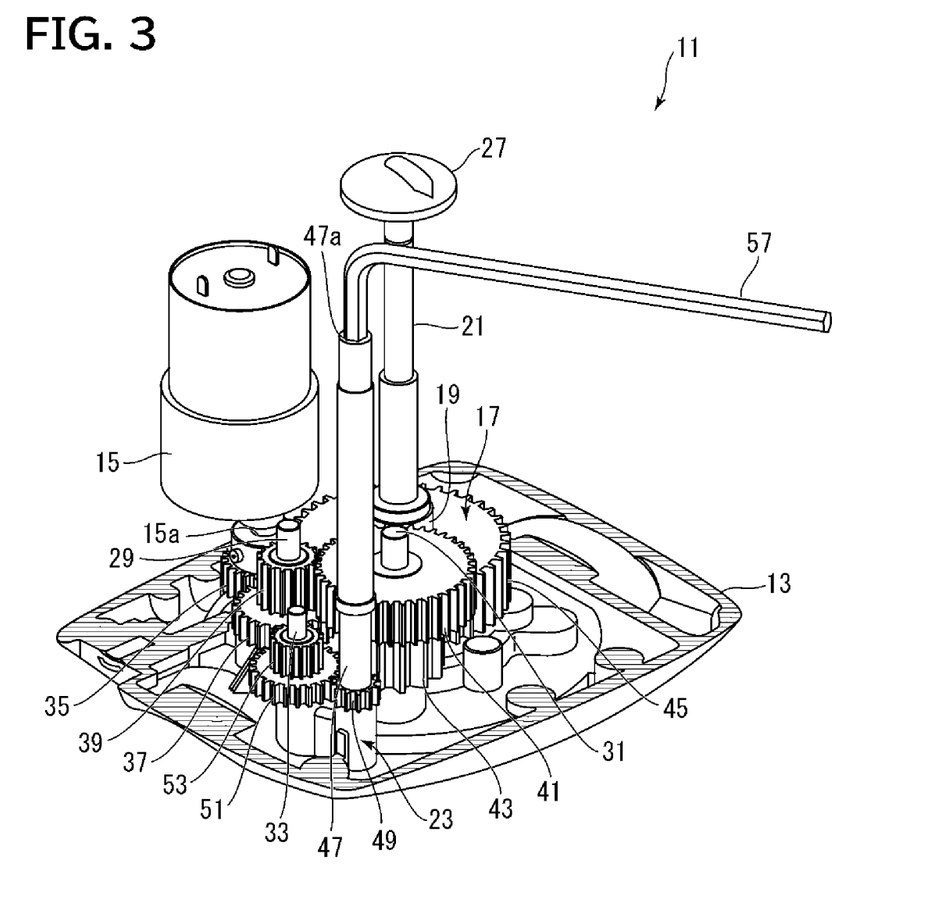
FIG. 3 is a perspective view showing a gear transmission mechanism of the electric actuator shown in FIG. 2 in a state where only a part of a housing is left and a plate member is omitted.
Figure 4:
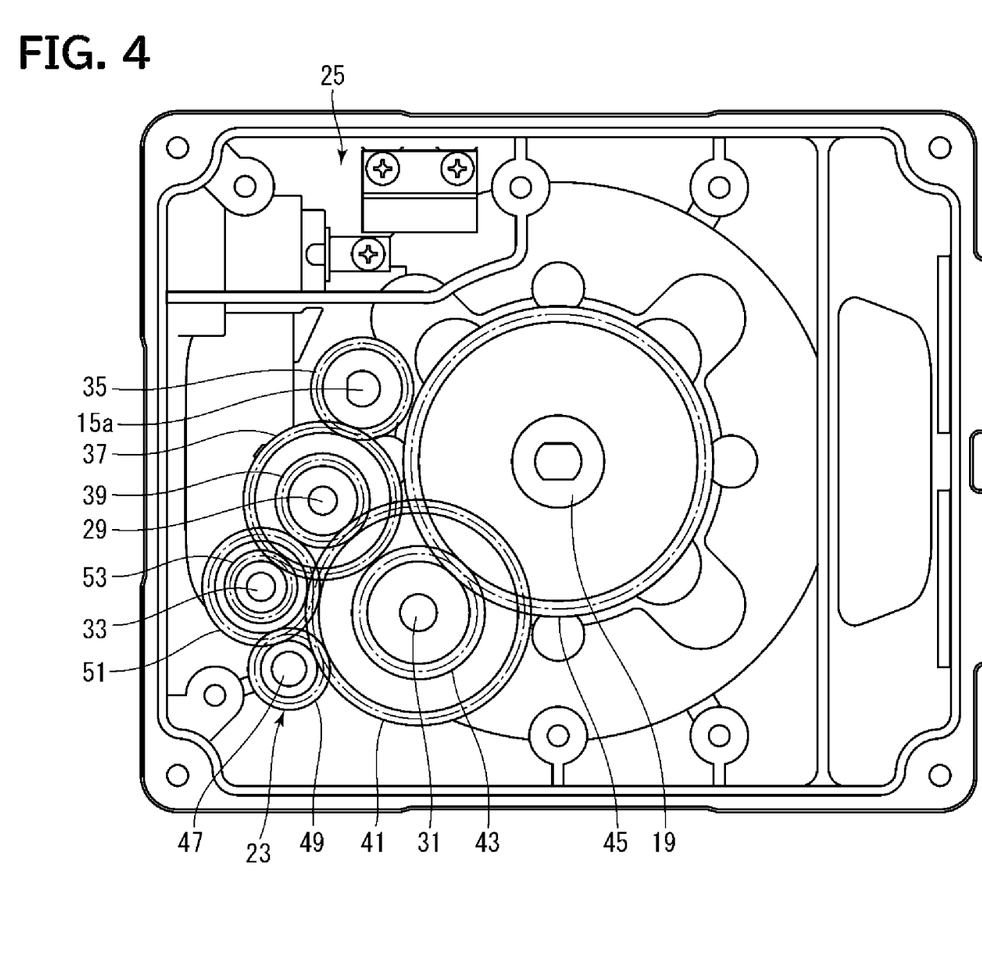
FIG. 4 is an explanatory view of the gear transmission mechanism of the electric actuator shown in FIG. 3 as viewed from above in order to show the arrangement of gears.

The manual operation mechanism 23 is configured of a manual shaft 47, a manual gear 49 fixed to rotate in conjunction with the manual shaft 47, a fifth intermediate gear 51 attached to a third intermediate shaft 33 and engaging with the manual gear 49, and a sixth intermediate gear 53 attached to the third intermediate shaft 33 coaxially with the fifth intermediate gear 51 and engaging with the first intermediate gear 37 attached to the first intermediate shaft 29. This configuration makes it possible to transmit the rotation of the manual shaft 47 to the output shaft 19 via the manual gear 49, the fifth intermediate gear 51, the sixth intermediate gear 53, the first intermediate gear 37, the second intermediate gear 39, the third intermediate gear 41, the fourth intermediate gear 43, and the input gear 45. Both ends of the third intermediate shaft 33 are rotatably supported respectively by the bottom of the body part 13a of the housing 13 and the plate member 14. The fifth intermediate gear 51 and the sixth intermediate gear 53 attached to the third intermediate shaft 33 may be fixed to the fifth intermediate shaft 33 so as to rotate in conjunction with the fifth intermediate shaft 33 or may be attached to the fifth intermediate shaft 33 to freely rotate around the fifth intermediate shaft 33.

Such a configuration makes it possible to transmit the rotation of both the rotating shaft 15a of the electric motor 15 and the manual shaft 47 to the first intermediate shaft 29 by engaging the pinion gear 35 and the manual gear 49 with the first intermediate gear 37 so that both of the electric motor 15 and the manual shaft 47 can rotate the output shaft 19.

Figure 2:
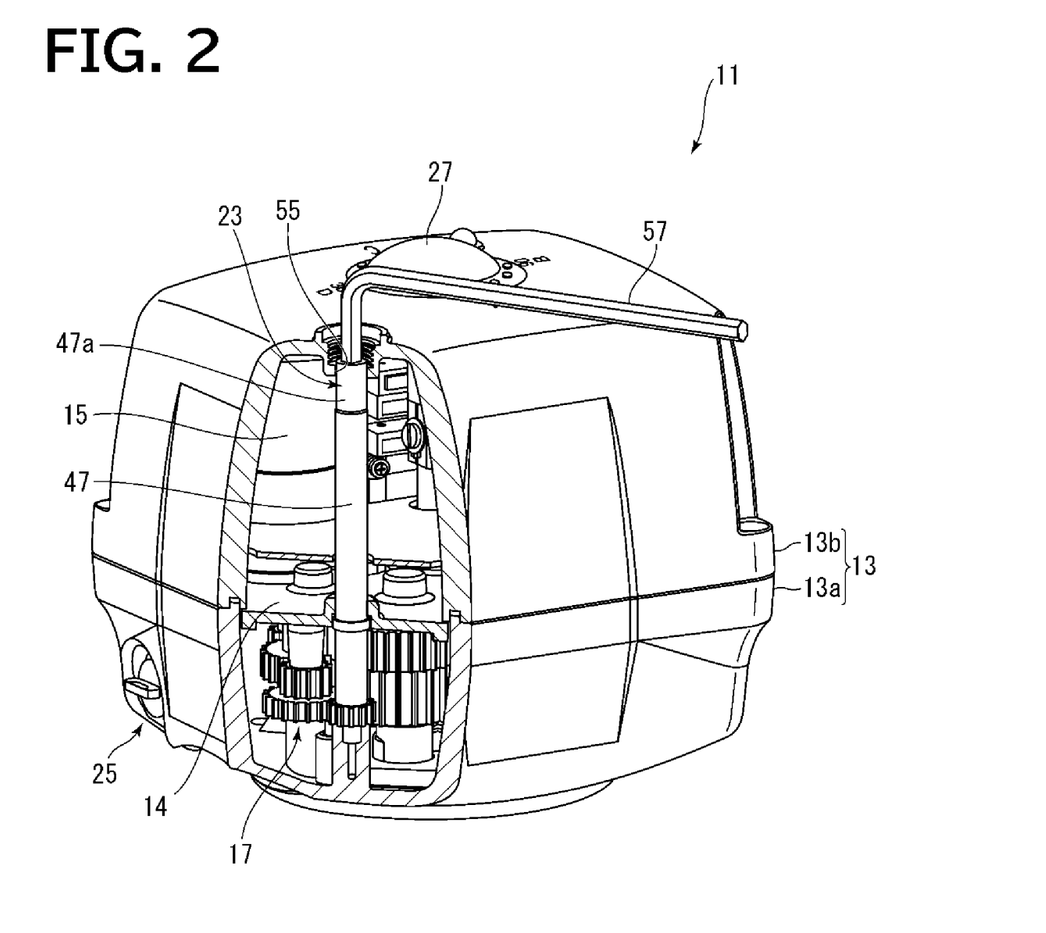
FIG. 2 is a partially broken perspective view showing the electric actuator with a wrench being connected to a manual shaft of the electric actuator shown in FIG. 1 in order to perform a manual operation.

The manual shaft 47 is rotatably supported by the plate member 14, and has an upper end portion protruding into a manual operation opening 55 formed in a ceiling portion of the cover part 13b of the housing 13. The upper end portion is formed with a connecting portion 47a for an operating member 57 such as a wrench to be able to connected thereto. The connecting portion 47a may include a hexagonal hole into which a hexagon wrench can be fitted, for example. The manual operation opening 55 is formed so that a cap 59 can be attached thereto. Under normal conditions, as shown in FIG. 1, the cap 59 is attached to the manual operation opening 55 so as to prevent access to the connecting portion 47a. By contrast, when a manual operation is performed, the cap 59 is removed from the manual operation opening 55 and the operating member 57 such as a wrench is then connected to the connecting portion 47a, as shown in FIG. 2, so that the output shaft 19 can be rotationally driven via the manual gear 49 or the like by manually rotating the manual shaft 47.

Figure 5:
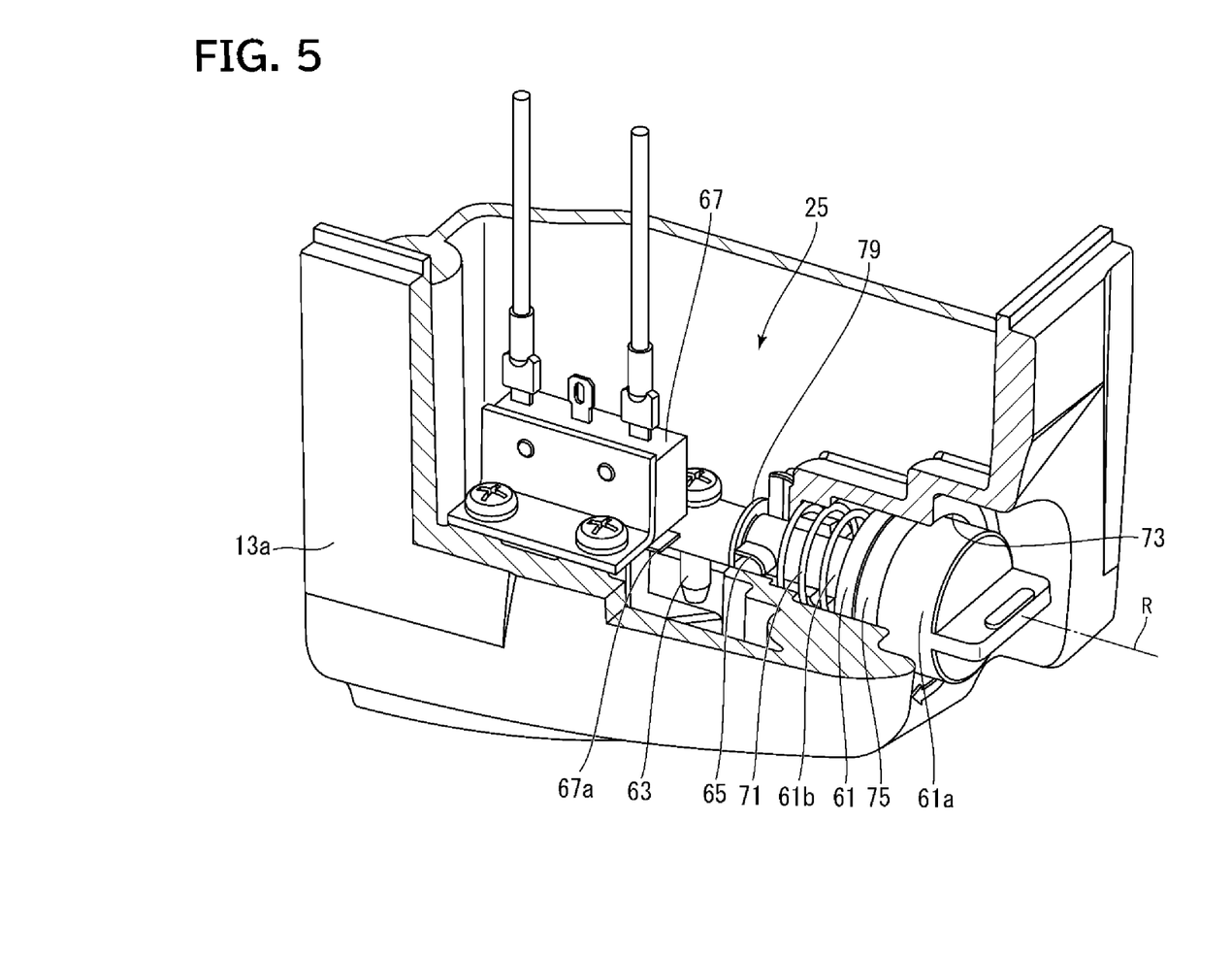
FIG. 5 is a partially broken perspective view enlarging and showing a power supply switching mechanism of the electric actuator shown in FIG. 1.
Figure 7:
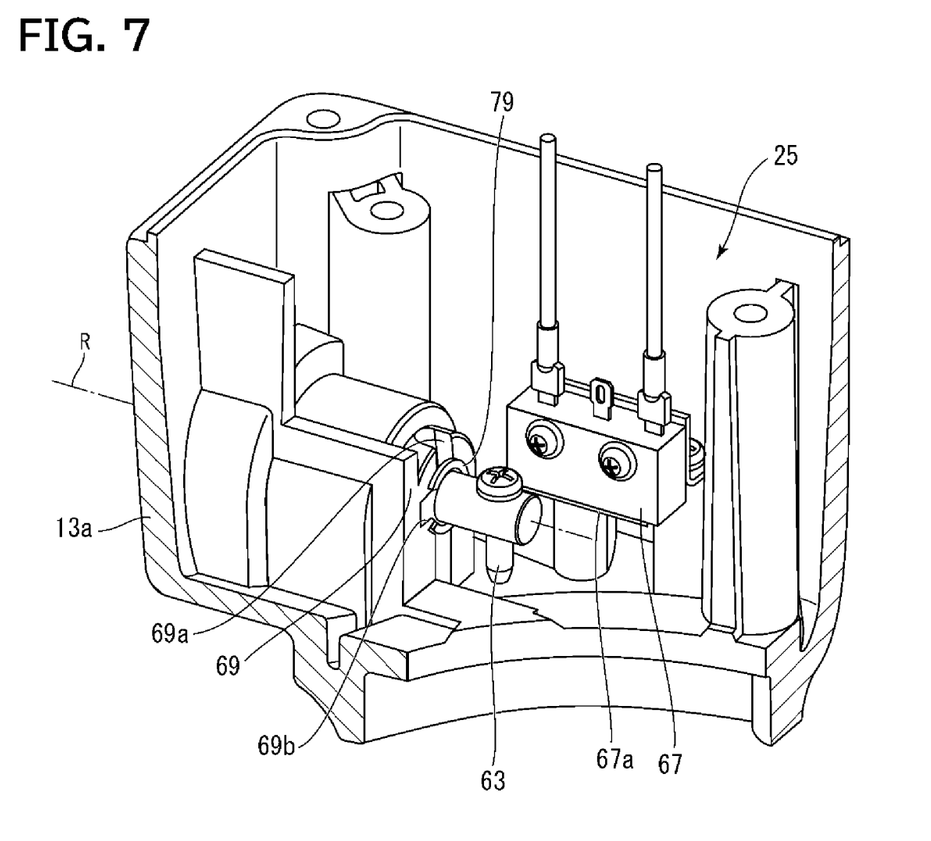
FIG. 7 is an explanatory view showing engagement grooves formed on an inner side wall of the housing of the electric actuator.

As shown in FIGS. 5 and 7, the power supply switching mechanism 25 is configured to include a selector member 61 having a detection object 63 and a position holding member 65, a detector 67 provided inside the housing 13 for detecting the detection object 63, a cooperation surface 69 provided inside the housing 13 and having formed therein engagement grooves 69a and 69b adapted to be engageable with the position holding member 65, and a biasing member 71 biasing the selector member 61 so as to make the position holding member 65 approach the cooperation surface 69. The detector 67 is configured to electrically cut off a power supply 83 and the electric motor 15 serving as an electric driving unit to cut off the supply of power to the electric motor 15, when the detection object 63 is detected by approach of the detection object 63 to the detector 67. In the shown embodiment, a limit switch mechanically detecting the detection object 63 by physical contact of the detection object 63 with a detecting portion 67a such as a lever is used as the detector 67. However, if the approaching and separating of the detection object 63 can be detected, a sensor detecting the detection object 63 in another method, such as an electromagnetic sensor electromagnetically detecting a detection object or an optical sensor optically detecting a detection object, can be used as the detector 67.

Figure 6:
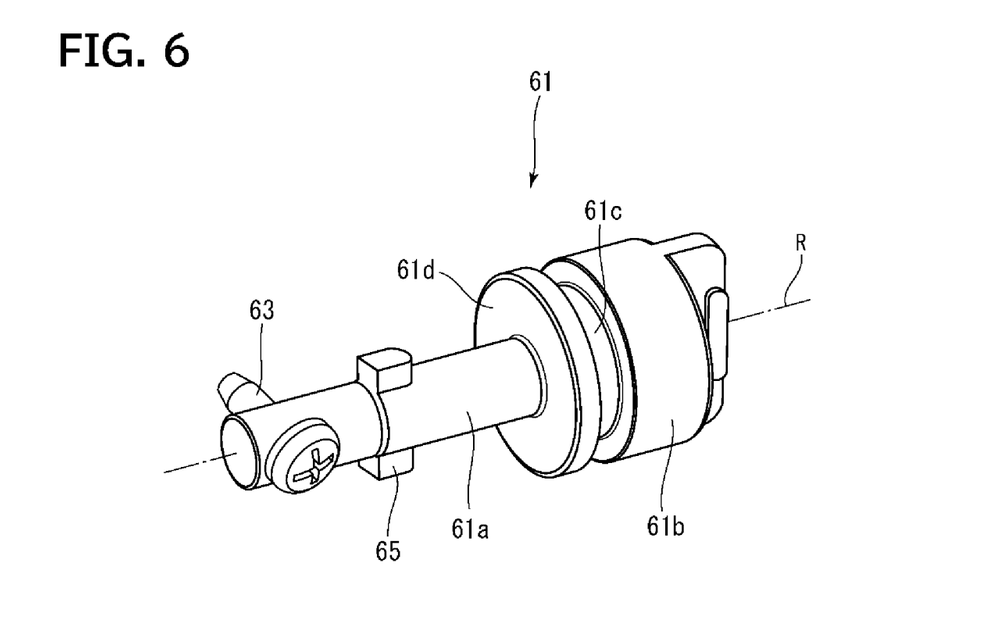
FIG. 6 is a perspective view showing a selector member of the power supply switching mechanism of the electric actuator shown in FIG. 1.

As shown in detail in FIG. 6, the selector member 61 includes a substantially cylindrical shaft part 61a having a working end portion, and a knob part 61b serving as an operating end portion formed at an end of the shaft part 61a opposite the working end portion to have a larger diameter than the shaft part 61a. The knob part 61b is formed on the outer surface of the body part 13a of the housing 13 and is housed in a cylindrical knob receiving recess 73 having a slightly larger diameter than the knob part 61b. The shaft part 61a extends through the bottom of the knob receiving recess 73 into the housing 13. In other words, the selector member 61 is arranged to extend through the peripheral wall of the housing 13 so that the working end portion protrudes inside the housing 13 and the operating end portion protrudes outside the housing 13. The knob part 61b has an outer peripheral surface formed thereon with an annular groove 61c for an O-ring 75 to be placed therein. This configuration can seal between the outer peripheral surface of the knob part 61b and the inner peripheral surface of the knob receiving recess 73 to prevent foreign matter, moisture, etc. from entering the housing 13 through the knob receiving recess 73 from the outside. The shaft part 61a is supported by the housing 13 so as to be able to rotate about a rotation axis R and to move in a direction of the rotation axis R. In other words, the selector member 61 can be rotated about the rotation axis R and to be moved in the direction of the rotation axis R by an operator gripping the knob part 61b. There is a coil spring arranged as the biasing member 71 inside the knob receiving recess 73 between the bottom surface of the knob receiving recess 74 and a step 61d formed between the shaft part 61a and the knob part 61b, to bias the selector member 61 outward. The biasing member 71 is not particularly limited if it can bias the selector member 61 toward the cooperation surface 69 in the direction of the rotation axis R, but it is preferable that a coil spring is used as the biasing member because it is cheap and easy to obtain it.

In the shown embodiment, the shaft part 61a and the knob part 61b are integrally formed, but the shaft part 61a and the knob part 61b may be separately formed and connected to each other.

The detection object 63 and the position holding member 65 are provided in a portion of the shaft part 61a to be arranged inside the housing 13. The detection object 63 has a pin shape, and is provided at the working end portion of the shaft part 61a so as to protrude and extend from the outer peripheral surface of the shaft part 61a in a direction intersecting the rotation axis R of the selector member 61. In the shown embodiment, the detection object 63 is formed as a pin member separate from the selector member 61 and is threadedly engaged with and fixed to the shaft part 61a of the selector member 61. However, the detection object 63 may be formed integrally with the selector member 61. The position holding member 65 is provided so as to protrude from the outer peripheral surface of the shaft part 61a in the direction intersecting the rotation axis R of the selector member 61. In the shown embodiment, the position holding member 65 is formed integrally with the shaft part 61a. However, the position holding member 65 may be formed as a separate body from the selector member 61 and then fixed to the shaft part 61a. Additionally, in the shown embodiment, the cooperation surface 69 is provided on the inner surface of the peripheral wall of the body part 13a of the housing 13 through which the shaft part 61a of the selector member 61 extends, and the position holding member 65 is provided on the side of the shaft part 61a of the selector member 61 closer to the cooperation surface 69 than the detection object 63. Moreover, a second engagement groove 69b described later extends through the bottom of the knob receiving recess 73, so that the position holding member 65 can be prevented from passing through the second engagement groove 69b by inserting the selector member 61 into the knob receiving recess 73 with the working end portion in the lead, making the position holding member 65 pass into the housing 13 through the second engagement groove 69b, and then mounting a retaining ring 79 adjacent to the position holding member 65 on the side far from the knob part 61b to prevent the position holding member 65.

As well shown in FIG. 7, the cooperation surface 69 is formed with two engagement grooves extending thereon in directions intersecting each other, namely, the first engagement groove 69a and the second engagement groove 69b, with which the position holding member 65 can be engaged, thereby preventing the selector member 61 from rotating about the rotation axis R. In the shown embodiment, the first engagement groove 69a extending in a vertical direction and the second engagement groove 69b extending in a horizontal direction are formed on the cooperation surface 69 so as to be orthogonal to each other. The first engagement groove 69a and the second engagement groove 69b are formed so that the detection object 63 is positioned in a detectable area where the detection object 63 can be detected by the detector 67 when the selector member 61 is biased by the biasing member 71 and the position holding member 65 is engaged with the first engagement groove 69a, while the detection object 63 is positioned in an undetectable area where the detection objection 63 cannot be detected by the detector 67 when the selector member 61 is biased by the biasing member 71 and the position holding member 65 is engaged with the second engagement groove 69b.

As a result, by rotating the selector member 61 about the rotation axis R to switch whether the position holding member 65 is engaged with the first engagement groove 69a or with the second engagement groove 69b, it is possible to selectively switch between the supply and cutoff of power to the electric motor 15 serving as an electric driving unit. When the position holding member 65 engages with the first engagement groove 69a or the second engagement groove 69b, the selector member 61 is locked in a state where the detection object 63 is positioned in the detectable area or the undetectable area of the detector 67, and unless the selector member 61 is moved in the direction of the rotation axis R against a biasing force of the biasing member 71 so as to move the position holding member 65 away from the cooperation surface 69 and is rotated about the rotation axis R, a state where the detector 67 can detect the detection object 63 or a state where the detector cannot detect the detection object 63 is maintained.

In the electric actuator 11 thus configured, the position holding member 65 is pressed by the biasing force of the biasing member 71 toward the cooperation surface 69, namely, the inner surface of the peripheral wall of the body part 13a of the housing 13, when no external force is applied. Therefore, if the position holding member 65 is engaged with one of the two engagement grooves 69a and 69b, the selector member 61 can be locked to prevent the rotation thereof and thus a state where power is supplied or a state where power is cut off can be maintained. In order to switch between the supply and cutoff of power when the selector member 61 is in the locked state, it is necessary to push the selector member 61 into the housing 13 in the direction of the rotation axis R against the biasing force of the biasing member 71 and then rotate the selector member 61 about the rotation axis R by applying an external force to the knob part 61b so as to move the detection object 63 from one to the other of the detectable area and the undetectable area of the detector 67. In other words, in order to switch between the supply and cutoff of power to the electric motor 15 serving as an electric driving unit, it is necessary to perform two-step operations, namely, the movement of the selector member 61 in the direction of the rotation axis R against the biasing force of the biasing member 71 and then the rotation of the selector member 61 about the rotation axis R. As a result, if the selector member 61 is in the locked state, simply applying a force to the knob part 61b in the direction of the rotation axis R or trying to rotate the knob part 61b cannot switch between the supply and cutoff of power. Therefore, unintentional switching between the supply and cutoff of power can be prevented and thus safety can be enhanced.

In the above embodiment, the cooperation surface 69 is provided on the inner surface of the body part 13a of the housing 13. However, the cooperation surface 69 may be provided on a wall such as a partition wall provided inside the housing 13 at a position farther than the detector 67 in the direction of the rotation axis R of the selector member 61 from a side wall of the body part 13a of the housing 13 through which the selector member 61 extends. In this case, the position holding member 65 is biased by the biasing member 71 in a direction away from the side wall of the body 13a of the housing 13. Therefore, in order to switch between the supply and cutoff of power, the selector member 61 should be drawn out from the inside of the housing 13 in the direction of the rotation axis R against the biasing force of the biasing member 71 by applying an external force to the knob part 61b and be then rotated about the rotation axis R, thereby moving the detection object 63 from one to the other of the detectable area and the undetectable area of the detector 67.

Figure 8:
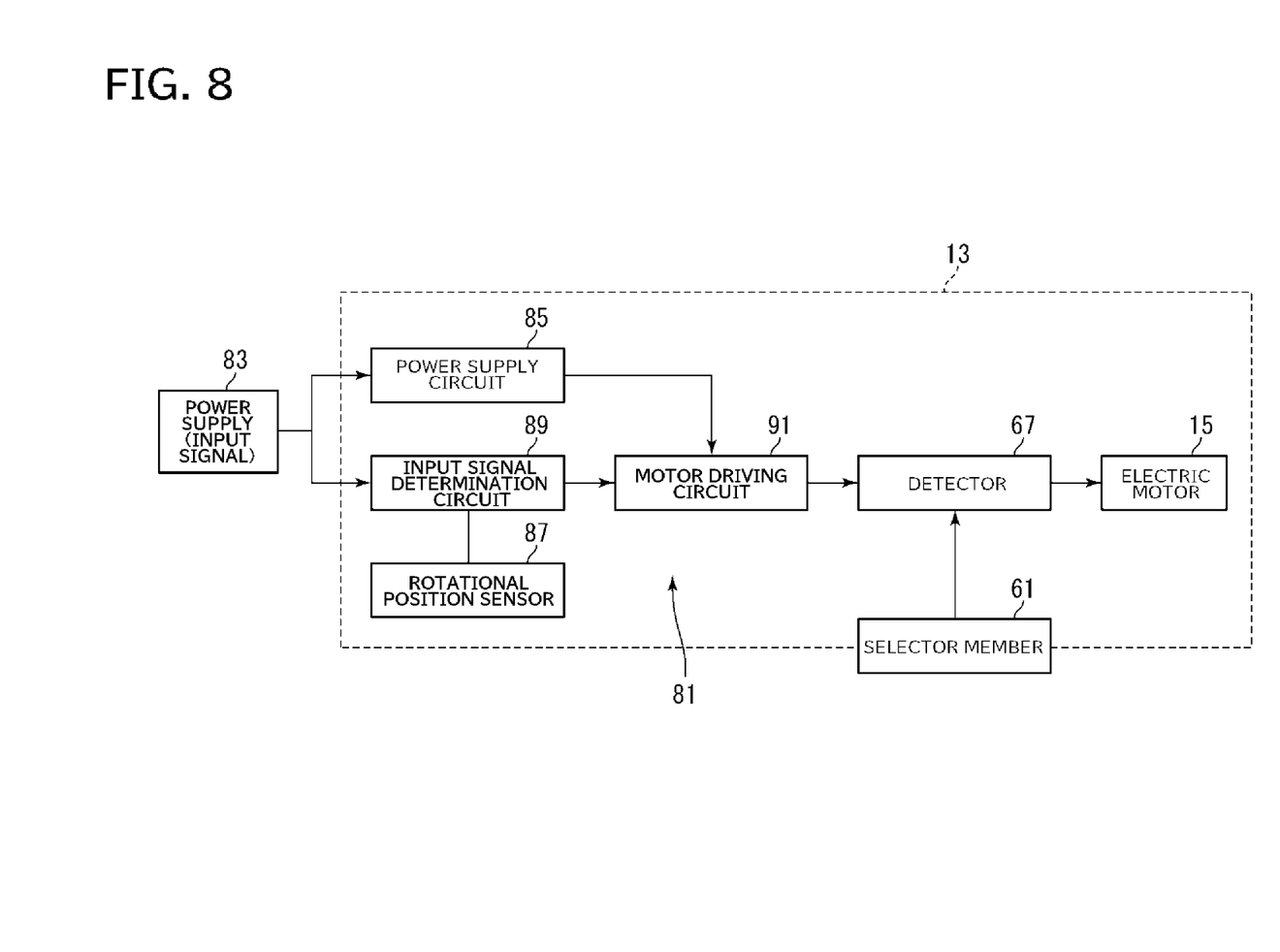
FIG. 8 is a block diagram showing a configuration of a motor drive control mechanism of the electric actuator.

Next, a motor drive control mechanism 81 of the electric motor 15 serving as an electric driving unit of the electric actuator 11 in the shown embodiment will be described with reference to FIG. 8.

The motor drive control mechanism 81 is configured by the power supply 83, a power supply circuit 85, a rotational position sensor 87, an input signal determination circuit 89, a motor driving circuit 91, a limit switch serving as the detector 67, and the electric motor 15 serving as the electric driving unit. When the electric motor 15 is an AC motor, the power supply circuit 85 converts a current supplied from the power supply 83 into an alternating current and then supplies the converted current to the motor driving circuit 91. When the electric motor 15 is a DC motor, the power supply circuit 85 converts a current supplied from the power supply 83 into a direct current and then supplies the converted current to the motor driving circuit 91. The rotational position sensor 87 detects a rotational position of the output shaft 19. For example, the rotational position sensor detects the rotational position of the output shaft 19 by a cam attached to the output shaft 19. As a result, when the electric actuator 11 is used for the opening and closing of a valve, for example, an opening degree of the valve can be detected. The voltage supply direction from the power supply 83 can be switched depending on whether the electric actuator 11 is activated in a forward direction or in a reverse direction. The input signal determination circuit 89 determines whether the electric motor 15 is to be rotated in the forward direction or in the reverse direction, by using as an input signal a signal indicative of which of two voltage terminals (not shown) a positive voltage (plus voltage) is applied to from the power supply, and with reference to the output from the rotational position sensor 87, activates the motor driving circuit 91 to rotate the output shaft 19 until the output shaft reaches a predetermined angular position. For example, when the electric actuator 11 is used for the opening and closing of the valve, the input signal determination circuit 89 determines whether the electric motor 15 is to be rotated in the valve opening direction or in the valve closing direction by using as an input signal the signal indicative of which of the two voltage terminals the positive voltage is applied to, and with reference to an output signal from the rotational position sensor 87, activates the motor driving circuit 91 to drive the electric motor 15 up to a predetermined rotational position (closed position or opened position) and to stop the rotation of the electric motor 15 when the output shaft reaches the predetermined rotational position. The motor driving circuit 91 controls the operation and stop of the electric motor 15 to rotate the electric motor 15 in accordance with an instruction signal from the input signal determination circuit 89.

In the motor drive control mechanism 81 of the electric actuator 11, the limit switch for detecting the detection object 63 of the selector member 61 described above is provided as the detector 67, and power to be supplied to the electric motor 15 from the power supply 83 is cut off when the detection object 63 is detected. As shown in FIG. 8, it is preferable that the limit switch, that is, the detector 67, is arranged between the motor driving circuit 91 and the electric motor 15 to electrically cut off the motor driving circuit 91 and the electric motor 15 when the detection object 63 is detected. When the output shaft 19 is driven by the manual shaft 47, as described above, the rotation of the manual shaft 47 is transmitted to the output shaft 19 via the manual gear 49, the fifth intermediate gear 51, the sixth intermediate gear 53, a first intermediate gear 29, a second intermediate gear 31, a third intermediate gear 33, the fourth intermediate gear 43, and the input gear 45. At the same time, the rotation of the manual shaft 47 is also transmitted to the rotating shaft 15a of the electric motor 15 via the first intermediate gear 29 and the pinion gear 35. This can cause an adverse effect on the motor driving circuit 91, such as damage to the motor driving circuit 91, when a back electromotive force generated in the electric motor 15 is transmitted to the motor driving circuit 91. However, if the detector 67 is arranged between the motor driving circuit 91 and the electric motor 15 and electrical cutoff is performed between the motor driving circuit 91 and the electric motor 15 during manual operation, a back electromotive force is not transmitted to the motor driving circuit 91 even if the back electromotive force occurs in the electric motor 15 by the rotation of the manual shaft 47, thereby making it possible to prevent adverse effects on the motor driving circuit 91.

Next, an operation of the selector member will be described with reference to FIGS. 9A to 9D.

Figure 9A:
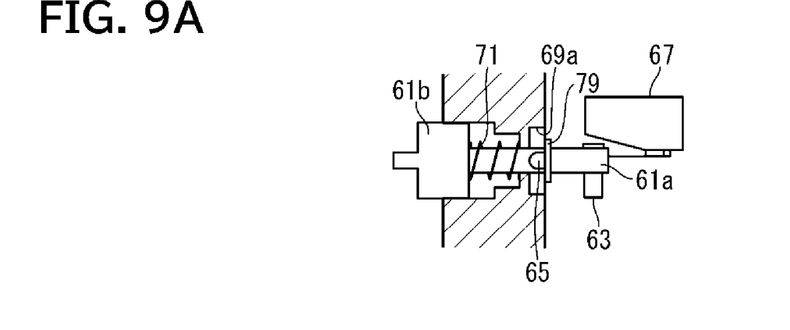
FIG. 9A is an explanatory view for explaining a switching operation of the electric actuator shown in FIG. 1 between the supply of power and the cutoff of power.

Under normal conditions, as shown in FIG. 9A, the selector member 61 is positioned in the undetectable area of the limit switch that is the detector 67 in the state where the position holding member 65 engages with the second engagement groove 69b of the cooperation surface 69 and the detection object 63 of the selector member 61 extends downward from the shaft part 61a, and the limit switch electrically connects the motor driving circuit 91 and the electric motor 15 with each other to supply power from the power supply 83 to the electric motor 15 via the motor driving circuit 91. Therefore, in this state, the electric actuator 11 operates in accordance with an input signal.

Figure 9B:
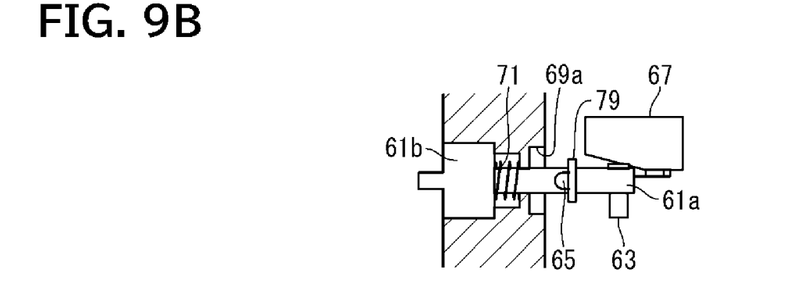
FIG. 9B is an explanatory view for explaining a switching operation of the electric actuator shown in FIG. 1 between the supply of power and the cutoff of power.
Figure 9C:
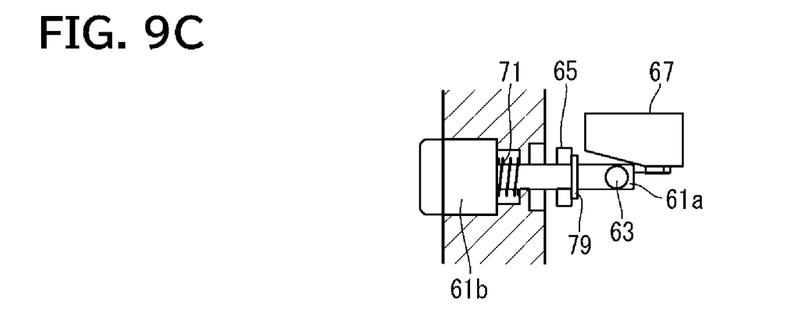
FIG. 9C is an explanatory view for explaining a switching operation of the electric actuator shown in FIG. 1 between the supply of power and the cutoff of power.
Figure 9D:
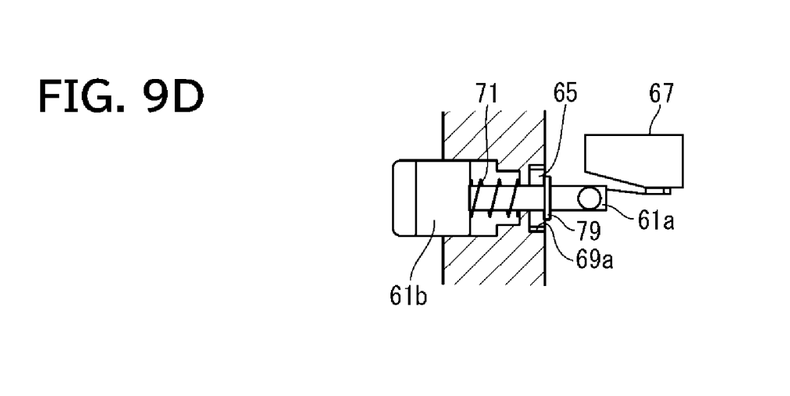
FIG. 9D is an explanatory view for explaining a switching operation of the electric actuator shown in FIG. 1 between the supply of power and the cutoff of power.

To the contrary, when the supply of power to the electric motor 15 from the power supply 83 is required to be cut off, for example, when a manual operation is required for maintenance etc. of the electric actuator 11 or when an emergency stop is required, the selector member 61 is first pushed along the rotation axis R against the biasing force of the biasing member 71 to make the position holding member 65 of the selector member 61 separate from the second engagement groove 69b, as shown in FIG. 9B. As a result, the second engagement groove 69b and the position holding member 65 are disengaged from each other, so that the selector member 61 can rotate about the rotation axis R. Next, as shown in FIG. 9C, the selector member 61 is rotated from a state where the detection object 63 extends downward from the shaft part 61a to a state where it extends horizontally, by gripping the knob part 61b to rotate it 90°. As a result, the detection object 63 abuts against the lever part 67a of the limit switch serving as the detector 67 to be moved to a detectable position where the limit switch can detect the detection object 63, and the motor driving circuit 91 and the electric motor 15 is electrically cut off, resulting in cutoff of the supply of power from the power supply 83 to the electric motor 15 via the motor driving circuit 91. Furthermore, when the selector member 61 is pulled back outward along the rotation axis R in accordance with the biasing force of the coil spring that is the biasing member 71 while the knob part 61b is gripped, as shown in FIG. 9D, the position holding member 65 of the selector member 61 engages with the first engagement groove 69a extending orthogonal to the second engagement groove 69b to lock the selector member 61 because the position holding member 65 is shifted to a 90° rotated state from the state shown in FIG. 9A. As a result, the selector member 61 cannot rotate about the rotation axis R. In this state, the supply of power from the power supply 83 to the electric motor 15 via the motor driving circuit 91 is cut off, and the output shaft 19 of the electric actuator 11 cannot be rotated by the electric motor 15 until the selector member 61 is again rotated to a position where the limit switch serving as the detector 67 cannot detect the detection object 63. Thus, the output shaft 19 of the electric actuator 11 can be rotated only by operating the manual shaft 47. In order to again resume the supply of power to the electric motor 15, the selector member 61 should be rotated to shift the detection object 63 from a state where it extends horizontally from the shaft part 61a to a state where it extends downward from the shaft part 61a, by again pushing the selector member 61 along the rotation axis R against the biasing force of the coil spring that is the biasing member 71 to disengage the first engagement groove 69a and the position holding member 65 from each other and allow the selector member 61 to rotate about the rotation axis R, and then by gripping the knob part 61b to rotate it 90°.

When the supply of power to the electric motor 15 from the power supply 83 is required to be cut off, especially when a manual operation of the electric actuator is required for maintenance etc., it may cause damage to an operator if the electric actuator should operate in accordance with an input signal by resuming the supply of power to the electric motor 15 from the power supply 83 due to erroneous operation. However, in the electric actuator 11, the position holding member 65 of the selector member 61 engages with the first engagement groove 69a when the supply of power from the power supply 83 to the electric motor 15 via the motor driving circuit 91 is cut off, and the selector member 61 cannot be rotated in order to switch between the supply and cutoff of power from the power supply 83 to the electric motor 15, unless the selector member 61 is pushed in the direction of the rotation axis R against the biasing force of the coil spring that is the biasing member 71 in the direction of the rotation axis R, in addition to the mere rotation of the selector member 61 about the rotation axis R. Therefore, the mere rotation of the selector member 61 about the rotation axis R cannot resume the supply of power to the electric motor 15, and thus switching from the cutoff of power to the supply of power due to erroneous operation can be inhibited and an operator can safely perform a manual operation. In the electric actuator 11, the output shaft 19 can be also driven by the manual operation in a state where electrical cutoff between the motor driving circuit 91 and the electric motor 15 is performed by engaging the position holding member 65 with the first engagement groove 69a. Therefore, even if the rotation of the output shaft 19 by the manual operation is transmitted to the electric motor 15 via the gear transmission mechanism 17 to generate a back electromotive force, the back electromotive force is not transmitted to the motor driving circuit 91 and thus it is possible to prevent adverse effects.

While the electric actuator 11 according to the present invention has been described above with reference to the embodiment shown in the figures, the present invention is not limited to the shown embodiment. For example, in the above-described embodiment, the cooperation surface 69 is formed on the inner surface of the side wall of the housing 13. However, the cooperation surface 69 may be provided on a partition wall provided inside the housing 13. Moreover, although the electric motor 15 is used as an electric driving unit in the embodiment shown in the figures, any other types of electric driving unit such as an electric cylinder may be used if the driving unit operates by the supply of power. Furthermore, in the shown embodiment, the limit switch that is the detector 67 is configured to electrically cut off the motor driving circuit 91 and the electric motor 15 when the detection object 63 is detected. However, if electrical connection and disconnection between the motor driving circuit 91 and the electric motor 15 can be switched in accordance with whether the detection object 63 is positioned in the detectable area or in the undetectable area, the detector 67 may be configured to electrically connect between the motor driving circuit 91 and the electric motor 15 when the detection object 63 is detected.

DESCRIPTION OF REFERENCE NUMERALS 11 electric actuator
13 housing
15 electric motor 17 gear transmission mechanism
19 output shaft
61 selector member
63 detection object
65 position holding member
67 detector
69 cooperation surface
69a first engagement groove
69b second engagement groove
71 biasing member
83 power supply
91 motor driving circuit

The invention claimed is:

1. An electric actuator including a housing and an electric driving unit driving an output shaft supported by the housing, said electric actuator comprising:
 a selector member having a working end portion protruding inside the housing and an operating end portion protruding outside the housing, said selector member being rotatable about a rotation axis and movable in a direction of the rotation axis by operation of the operating end portion;
 a position holding member provided in a portion of the selector member to be arranged inside the housing so as to protrude in a direction intersecting the rotation axis;
 a detection object provided at the working end portion of the selector member so as to extend in the direction intersecting the rotation axis;
 a detector provided inside the housing to detect the detection object;
 a first engagement groove for engaging with the position holding member, provided on a cooperation surface inside the housing; and
 a biasing member biasing the selector member in the direction of the rotation axis to make the position holding member approach the cooperation surface,
 wherein the first engagement groove is formed so that the detection object is positioned in one of a detectable area where the detection object can be detected by the detector and an undetectable area where the detection object cannot be detected by the detector when the position holding member is engaged with the first engagement groove, and the detector is configured to switch between supply and cutoff of power to the electric driving unit in accordance with whether the detection object is positioned in the detectable area or in the undetectable area.

2. The electric actuator according to claim 1, wherein the detector is configured to cut off the supply of power to the electric driving unit when the detection object is detected, and the first engagement groove is formed so that the detection object is positioned in the detectable area when the position holding member is engaged with the first engagement groove.

3. The electric actuator according to claim 1, further comprising a second engagement groove provided on the cooperation surface and extending in a direction intersecting the first engagement groove, said second engagement groove being formed so that the detection object is positioned in the other of the detectable area and the undetectable area when the position holding member is engaged with the second engagement groove.

4. The electric actuator according to claim 3, wherein the first engagement groove and the second engagement groove are formed so as to be orthogonal to each other.

5. The electric actuator according to claim 1, wherein the cooperation surface is an inner surface of a peripheral wall of the housing through which the selector member extends.

6. The electric actuator according to claim 1, wherein the electric driving unit is an electric motor.

7. The electric actuator according to claim 6, wherein the electric actuator further comprises a driving circuit for controlling drive of the electric motor, the electric motor is supplied with power via the driving circuit, and the detector is configured to electrically cut off the driving circuit and the electric motor when the detection object is detected.

8. The electric actuator according to claim 6, wherein the output shaft is configured to be driven by the electric motor via a transmission mechanism, and the electric actuator further comprises a manual operation shaft which can transmit rotation to the output shaft via the transmission mechanism.

9. The electric actuator according to claim 1, wherein the detector is a limit switch configured to detect the detection object by contact with the detection object.

10. The electric actuator according to claim 1, wherein the position holding member is formed integrally with the selector member.

11. The electric actuator according to claim 1, wherein the detection object is a pin-shaped separate member connected to the selector member.

* * * * *